US008364447B2

(12) United States Patent
Massonnat

(10) Patent No.: US 8,364,447 B2
(45) Date of Patent: Jan. 29, 2013

(54) METHOD, PROGRAM AND COMPUTER SYSTEM FOR CONCILIATING HYDROCARBON RESERVOIR MODEL DATA

(75) Inventor: Gérard Massonnat, Idron (FR)

(73) Assignee: Total S.A., Courbevoie (FR)

( * ) Notice: Subject to any disclaimer, the term of this patent is extended or adjusted under 35 U.S.C. 154(b) by 282 days.

(21) Appl. No.: 12/668,402

(22) PCT Filed: Jul. 9, 2008

(86) PCT No.: PCT/FR2008/000997
§ 371 (c)(1),
(2), (4) Date: Mar. 30, 2010

(87) PCT Pub. No.: WO2009/027598

PCT Pub. Date: Mar. 5, 2009

(65) Prior Publication Data
US 2010/0185424 A1 Jul. 22, 2010

(30) Foreign Application Priority Data

Jul. 9, 2007 (FR) ..................................... 07 04951

(51) Int. Cl.
*G06F 7/60* (2006.01)
*G06G 7/48* (2006.01)
(52) U.S. Cl. ............................................. 703/2; 703/10
(58) Field of Classification Search ................. 703/2, 10
See application file for complete search history.

(56) References Cited

U.S. PATENT DOCUMENTS

| 5,838,634 | A | 11/1998 | Jones et al. |
| 7,254,091 | B1 | 8/2007 | Gunning et al. |
| 2010/0191514 | A1* | 7/2010 | Massonnat ...................... 703/2 |
| 2010/0312529 | A1 | 12/2010 | Souche et al. |
| 2011/0290478 | A1 | 12/2011 | Sun et al. |
| 2011/0308792 | A1 | 12/2011 | Le Ravalec et al. |

OTHER PUBLICATIONS

"Uncertainty in Well Test and Core Permeability Analysis: A Case Study in Fluvial Channel Reservoirs, Northern North Sea, Norway", Zheng, et al. AAPG Bulletin, Dec. 2000. Abstract only.*
"The future of stochastic and upscaling methods in hydrogeology", Noetinger, et al. Springer-Verlag 2005.*
"Reservoir Modeling Constrained to Multiple Well-Test Permeabilities", Campozana, et al. Society of Petroleum Engineer. 1996.*
International Searching Authority, International Preliminary Report on Patentability (translation) for PCT/FR2008/000996, dated Jun. 3, 2010, 11 pages.
International Searching Authority, International Search Report for PCT/FR2008/000996, dated Feb. 6, 2009, 2 pages.

(Continued)

*Primary Examiner* — Kandasamy Thangavelu
*Assistant Examiner* — Nithya Janakiraman
(74) *Attorney, Agent, or Firm* — Polsinelli Shughart PC

(57) ABSTRACT

A method and system for conciliating hydrocarbon reservoir model data. In one implementation, a set of local permeability values of a reservoir and an apparent permeability value of the reservoir are provided. A power value is numerically calculated from a mean power formula that relates the apparent permeability value of the reservoir to the local permeability values of the set via the power. The calculated power value is compared with a reference value. Depending on the outcome of the comparison, the set of local permeability values is modified.

10 Claims, 6 Drawing Sheets

OTHER PUBLICATIONS

Figure 1:
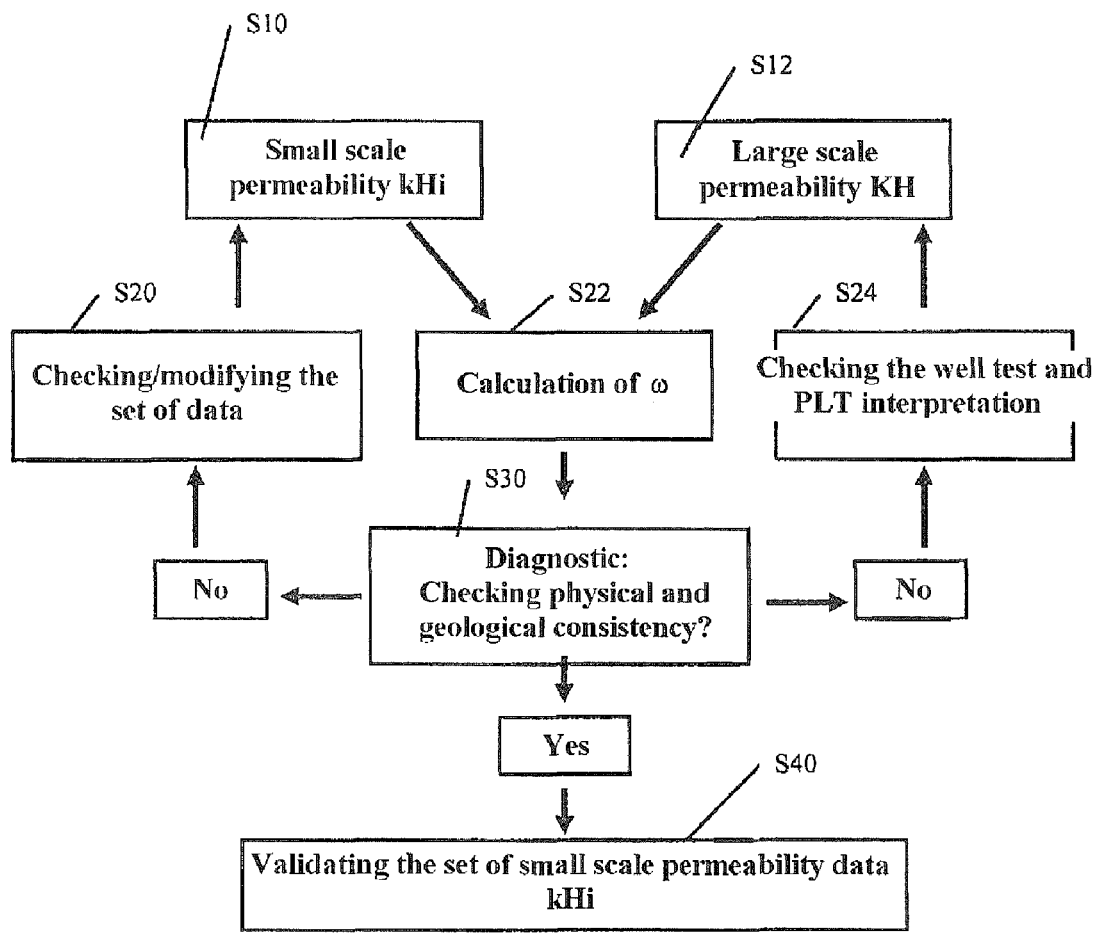

Noetinger B et al, Permeability Averaging for Well Tests in 3D Stochastic Reservoir Models, Society of Petroleum Engineers (SPE 36653) presented at Annual Technical Conference and Exhibition Oct. 6-9, 1996, 7 pages.

International Searching Authority, International Preliminary Report of Patentability (translation) for PCT/FR2008/000997, dated Jun. 3, 2010, 6 pages.

Non-Final Office Action, U.S. Appl. No. 12/668,394, mailed Mar. 2, 2012, 8 pages.

Haas. A. et al., *Stochastic Reservoir Modelling Constrained by Well Test Permeabillities*, Geostatistics Wollongong '96, vol. 1, 1997, pp. 501-511, Copyright 1997 Kluwer Academic Publishers, Netherlands.

Renard P., *Modelisation des ecoulements en milieux poreux heterogenes: calcul des permeabilites equivalentes* (*Flow Modeling in heterogeneous propous media: calculating equivalent permeabilities*), Ecole Des Mines de Paris No. 32, 1997, 258 pages, translation of relevant sections provided.

Wen X. et al., *High Resolution Reservoir Models Integrating Multiple-Well Production Data*, Society of Petroleum Engineers, Inc., Copyright 1997, pp. 115-129.

\* cited by examiner

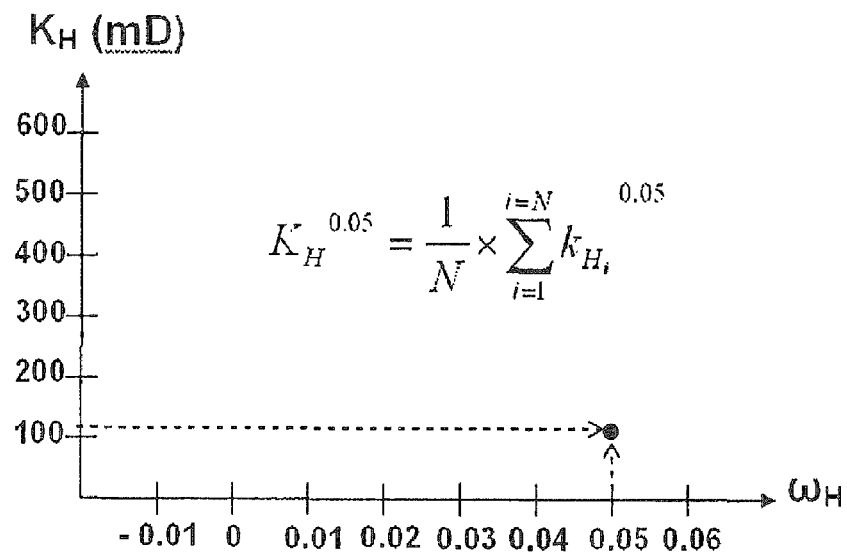
Fig. 2A
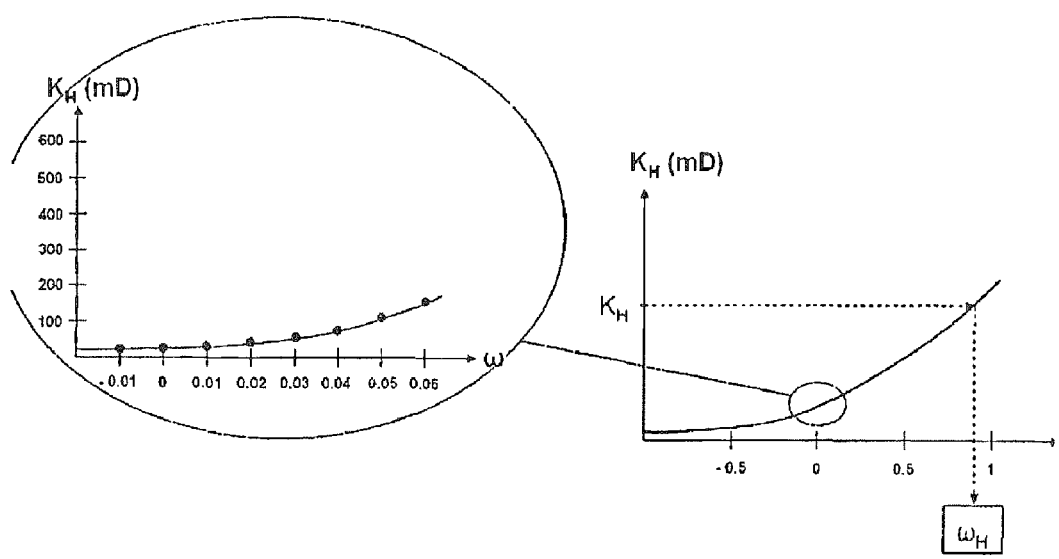
Fig. 2B
Fig. 2C

METHOD, PROGRAM AND COMPUTER SYSTEM FOR CONCILIATING HYDROCARBON RESERVOIR MODEL DATA

The present invention relates to a method, a program and a computer system for conciliating hydrocarbon reservoir model data.

Economic challenges related to the oil industry require the possibility of describing realistically the geological structure of hydrocarbon reservoirs and the properties of the rocks which make them up.

By reservoir, is meant a sufficiently porous and permeable rock for it to be able to contain fluids (water, oil, gas). These rocks (limestones, dolomites, sandstones) are of economic interest if their volumes are sufficient and if they are covered by impermeable layers preventing the fluid from escaping. A reservoir for example is a sedimentary deposit or a series of connected deposits which contains fluids (oil, gas, water . . . ). These deposits comprise porous and permeable rocks inside which fluids flow. These fluids may possibly accumulate forming a deposit.

A "facies" is a category in which a rock or a soil may be placed, and which is determined by one or more lithological features (lithofacies) or palaeontological features (biofacies). This term is also used for designating a category corresponding to a medium or a sedimentation domain.

The permeability of the rock determines its capability of letting through the fluid. Porosity is the percentage of empty space inside the rock and gives the volume of fluid which the latter may contain, whence its interest as regards oil prospecting.

Permeability and porosity are two fundamental petrophysical properties which one seeks to determine in order to describe the reservoir and its quality. These properties are not uniform in the whole reservoir, but depend on the geological structures which make it up. Heterogeneity of the reservoir results from this. Knowledge of the reservoir implies the determination of such heterogeneities.

A goal of characterizing reservoirs is to describe as accurately as possible the petrophysical features of the porous medium. In the case of hydrocarbon reservoirs, characterizing a reservoir represents an important economic challenge for different reasons: it should notably allow proper estimation of the exploitable reserves and provide information for a better localization of production wells. By characterizing it, it is therefore possible to provide assistance for deciding on the course of development of the deposit and more generally, it provides assistance with regards to oil field development and production.

In more details, understanding a reservoir requires good knowledge of the nature of the rocks and of the fluids which make it up, of the stresses and pressures to which it is subject, as well as its structure and its shape. Various characterization technologies are required for accessing this knowledge. Among these technologies, a distinction may be made between experimental characterization techniques and characterization techniques which aim at interpreting experimental data (interpretation, simulation, etc.).

The techniques used for determining the characteristics of a deposit are based on geophysics, in particular seismics, and geology.

Seismics especially provides the shape of the deposit, sometimes also the variations in the rock types and the boundaries between fluids (water, oil, gas).

Geology, in particular sedimentology, defines the nature of sedimentary deposits which are at the origin of the types of rocks (examples: sandstone, limestone, clay . . . ) present in the reservoirs. By a detailed study of the sedimentary background, it is possible to infer qualitative and quantitative information on the extension and heterogeneities present in the different types of rocks (facies).

On the experimental level, so-called exploratory or appraisal drillings have the purpose of getting better acquainted with the reservoirs by taking real samples of rocks and fluids. The data extracted from these drillings are of different natures and correspond to different investigation volumes:

Cores, from core drilling operations, allow characterization of the sedimentary nature of the rocks and of their petrophysical features (porosity, permeability measured in the laboratory). In this respect, core drilling is an operation which consists, during drilling, of taking samples of soils, either in the bottom of the hole, or sideways, i.e. from its walls.

logs are indirect measurements of the nature of the rock and of the fluids in the immediate surroundings of the wells. logging consists of measuring, after or during drilling, the characteristics of the rocks crossed, by means of different probes. In a general way, logging designates any recording of a characteristic of a geological formation crossed by a borehole, depending on the depth. logs complete the information drawn from the cores, and concern a more reduced scale. Core and logging techniques for example allow evaluation of the permeability and small scale porosity of a reservoir.

Well tests consist of evaluating the actual behavior of the reservoir during a production phase (pressure, flow rate . . . ). They allow indirect characterization of the quality of the reservoir in a domain of a typically hectometric size around the wells. Well tests have today become very efficient means for determining the dynamic characteristics of complex reservoirs. These tests are based on measurements of pressure drops and rises related to the opening and closing of production valves. For example they allow evaluation of the apparent (or effective) permeability K of a reservoir.

Characterization of the reservoirs also consists of producing a synthesis of the whole of these data in order to form a representation as accurate as possible of the reservoir, both with regard to its extension and its volume and to its "quality", i.e. its petrophysical features. This representation may be used as a basis for evaluating the benefit from the development of the relevant deposit.

In more details, in order to conduct development and production of a reservoir, and to predict its dynamic behavior depending on various production conditions, one resorts to numerical simulations on flow models. Geostatic models used for representing the geological structure of the reservoir (permeability, porosity, etc.) require discretization consisting of a large number of meshes and cells in these meshes, the number of cells may attain tens of millions.

These finely meshed models are populated with values of petrophysical variables such as porosity and permeability, while observing the variogram.

The variogram is a function currently used in geostatistics, with which the heterogeneity of a phenomenon may be quantified. It is expressed by means of:

the horizontal correlation length $L_H$; and the vertical correlation length $L_V$.

The vertical correlation length ($L_V$) is obtained by means of a logarithmic representation of local permeability. On the other hand, the horizontal correlation length ($L_H$) is a datum which is more difficult to measure, which is generally evaluated by the geologist. The ratio $L_H L_V$ is a measure of geostatistical anisotropy.

The thereby populated models are used for flow simulations. However, the numerical simulation time increases exponentially with the number of cells in the model, which may lead to very long computation times for very finely discretized models.

In order to achieve flow simulations within a reasonable computation time, one practice consists of building a coarse simulation model, by grouping cells in meshes and by assigning to the meshes an equivalent property calculated from local properties. This is the operation which is called "upscaling". By changing the scale from a fine scale to a larger scale, it is possible to limit the number of simulated cells. A reduced number of cells, after change in scale, allows faster computation. The change in scale is a main problem in the field of geostatistic; it is involved in many applications (computations of average block contents in the mining field, of mean porosities in the oil field, etc.).

Porosity is changed by simply taking the arithmetic mean of the porosities in the fine mesh.

The change in scale for permeability is not so simple. The physical meaning of apparent or effective permeability is that of a coefficient in Darcy's equation. The apparent permeability is the value of the homogenous permeability which emerges in a large domain, whereas local permeability is itself heterogeneous and at a finer scale. Apparent permeability is not an additive quantity. In fact, homogenized permeability is not necessarily the arithmetic mean of the permeabilities. Generally there is no means for analytically obtaining the value of the effective permeability. Therefore most often, one has to be satisfied by an approximated value of permeability.

This has been the subject of many investigations in the field of reservoir simulation. A method for changing scale should ideally provide an appropriate apparent (or effective) permeability, capturing the behaviors of the fluids of the system at cell (or fine mesh) level.

Different approaches for studying the change in scale of permeability have been proposed, for example the following publications may be consulted:

Wen X.-H. and al. "High Resolution Reservoir Models Integrating Multiple-Well Production Data". SPE 38728, Annual Technical Conference and Exhibition of the Society of Petroleum Engineers, San Antonio, 1997; and Renard P., "Modélisation des écoulements en milieux poreux hétérogènes: calcul des perméabilités équivalentes" (Flow modeling in heterogeneous porpous media: calculating equivalent permeabilities). Thesis, Ecole des Mines de Paris, Paris, 1999. Among the known techniques for changing scale, mention may be made of:

algebraic methods which propose simple analytic rules for a plausible calculation of the equivalent permeabilities without solving a problem of flow; and numerical techniques for changing scale wherein, in order to calculate the equivalent permeability, one is led to solving the pressure P and velocity v fields of a local or global flow problem.

Among the algebraic methods, the method of the mean power formula has proved to be most particularly effective; it consists of linking the apparent (large scale) permeability K to a power ω via the formula:

$$K^\omega = \frac{1}{N} \times \sum_{i=1}^{i=N} k_i^\omega.$$

In the above equation, when ω=−1, the power average is reduced to a harmonic average, whereas when ω=1, it becomes an arithmetic mean. At the limit ω=0, the apparent permeability becomes a geometrical mean of the local permeabilities. This formula assumes that local permeability is isotropic and random.

The apparent permeability of a composite block is supposed to be found between the harmonic and arithmetic means. This means that the exponent ω should be comprised between −1 and +1.

In particular, it was proposed to link the permeability K to the power ω via the formula:

$$K^\omega = \frac{1}{N} \times \sum_{i=1}^{i=N} k_i^\omega$$

wherein:

$$\omega = \frac{\text{Arctan}\alpha}{\pi - \text{Arctan}\alpha}$$

(see for example Haas, A. and Noetinger, B. (1995) 3D Permeability Averaging for Stochastic Reservoir Modelling Constrained by Well Tests, Reservoir Description Forum. The Heriot-Watt and Stanford University, 10-14 September, Puebles Hydro, UK.). This relationship is valid within the scope of an exponential variogram model, and when the medium is infinite with regards to heterogeneity.

A large number of experimental data are in fine available for characterizing a reservoir. However the scale at which the different data are obtained is very variable. Thus, values of local permeabilities may be obtained at a centimetric scale upon drilling cores for example and therefore characteristic of the immediate surroundings of the well, as well as global permeability values, obtained at a large scale, during the well test for example.

The problem of the integration of the numerous available data and obtained at different scales is posed. It is important to be able to conciliate or evaluate the relevance of different types of small scale data in order to be able to then populate a (computer/numerical) model of a reservoir. The invention is directed to solving this problem.

Therefore, the object of the invention is notably to provide a method for conciliating data of a hydrocarbon reservoir and more generally a method for exploiting a reservoir based on such a data conciliation method. Whatever the case, this method should allow improvement of tools for assisting decision making based on the characterization of hydrocarbon reservoirs. In fine, with this method, exploitation of a hydrocarbon reservoir should be facilitated. Preferably, with it, it should be also possible to determine the areas which contribute to the flow in the column of the reservoir subject of an investigation.

This goal is achieved by means of a method for conciliating hydrocarbon reservoir model data, implemented by means of a computer, comprising the steps of:

providing (S10) a set of local permeability values $k_{Hi}$ of the reservoir and (S12) a value of an apparent permeability $K_H$ of the reservoir; and numerically calculating (S22) a value of a power $\omega_H$, from a mean power formula of the type $$K_H^{\omega_H} = \frac{1}{N} \times \sum_{i=1}^{i=N} k_{H_i}^{\omega_H},$$

relating the apparent permeability $K_H$ to local permeabilities via the power $\omega_H$ and a set of values of local permeabilities $k_{H_i}$ and of the value of the apparent permeability $K_H$;

comparing (S30) the calculated power $\omega_H$ with a reference value; and depending on the comparison, modifying (S20) the values provided in the provision step.

In preferred embodiments, the method according to the invention comprises one or more of the following characteristics:

the method according to the invention further comprises, before the calculation step, a step for building a relationship $$K_H^{\omega_H} = f\left(\{k_{H_i}^{\omega_H}\}_{i=1,N}\right)$$

from the mean power formula and from the provided values of local permeabilities $k_{H_i}$, for numerically calculating (S22) the value of the power $\omega_H$;

the provided apparent permeability value $K_H$ is relative to a direction distinct from a direction of a well of the reservoir, for example a direction perpendicular to the direction of the well;

the provision step further comprises provision of a spatial correlation value $L_V$ of the reservoir along the direction of the well, the method further comprising a step for calculating a spatial correlation value $L_H$ along the direction of the apparent permeability $K_H$, from the power $\omega_H$, expressed as a function of the spatial correlations $L_V$, $L_H$;

the power $\omega_H$ is further a function of petrophysical anisotropy $k_V/k_H$ of the reservoir;

the power $\omega_H$ is expressed as $$\omega_H = \frac{\text{Arctan}\alpha}{\pi - \text{Arctan}\alpha},$$

wherein $$\alpha = \frac{L_H}{L_V} \times \sqrt{\frac{k_V}{k_H}},$$

the ratio $k_V/k_H$ being characteristic of petrophysical anisotropy;

the method according to the invention further comprises a step for numerically calculating a value of a power $\omega_V$, relatively to a vertical apparent permeability $K_V$, the power $\omega_V$ being expressed as $\omega_V = a\omega_H + b$, where a and b are constants;

the method according to the invention comprises a step for changing scale of the local permeability values $k_{H_i}$, based on the value of the calculated power; and the method according to the invention further comprises a step for estimating a characteristic of the reservoir, using a result from the scale-changing step.

The invention also relates to a computer program product, the program comprising routines for executing steps of the method according to the invention, when said program is executed on a computer.

The invention further relates to a computer system comprising a memory containing a program comprising routines for executing the steps of the method according to the invention, when said program is executed.

Figure 3:
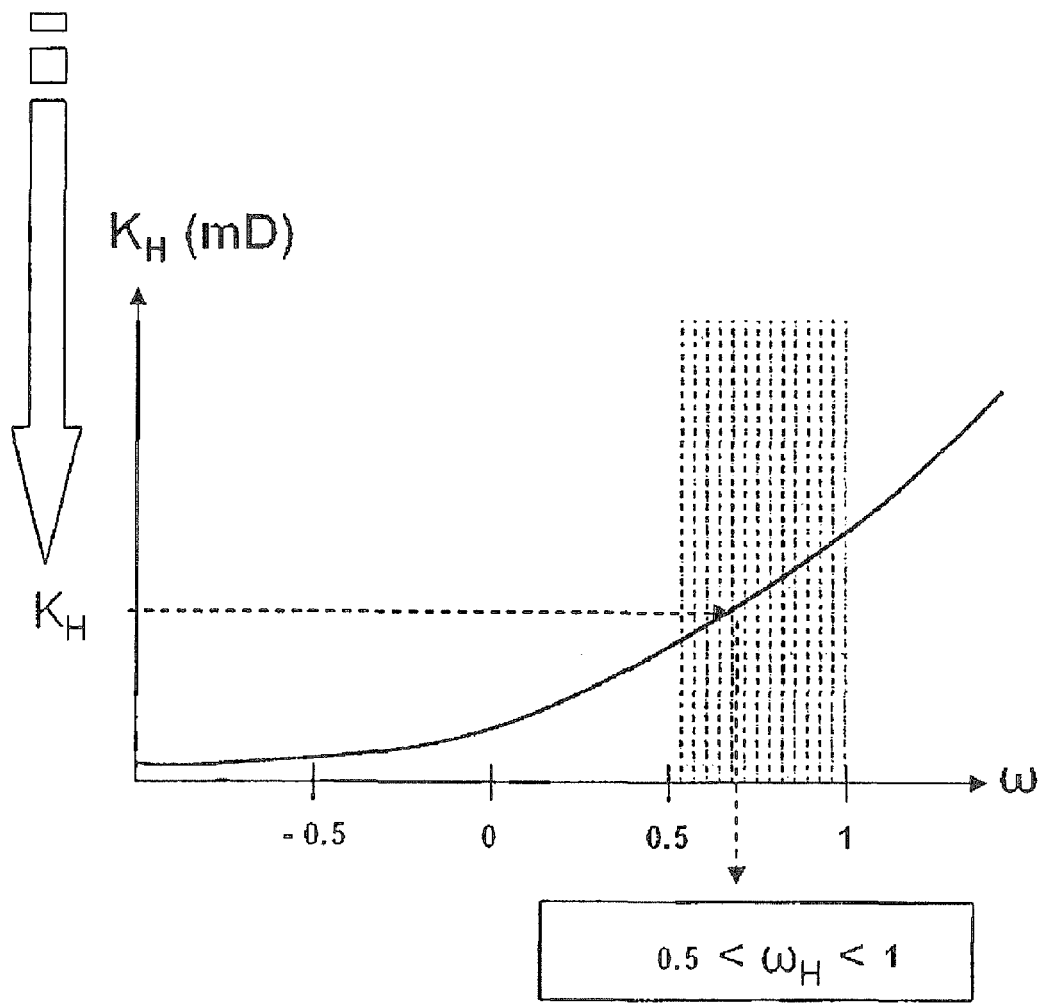
Figure 4:
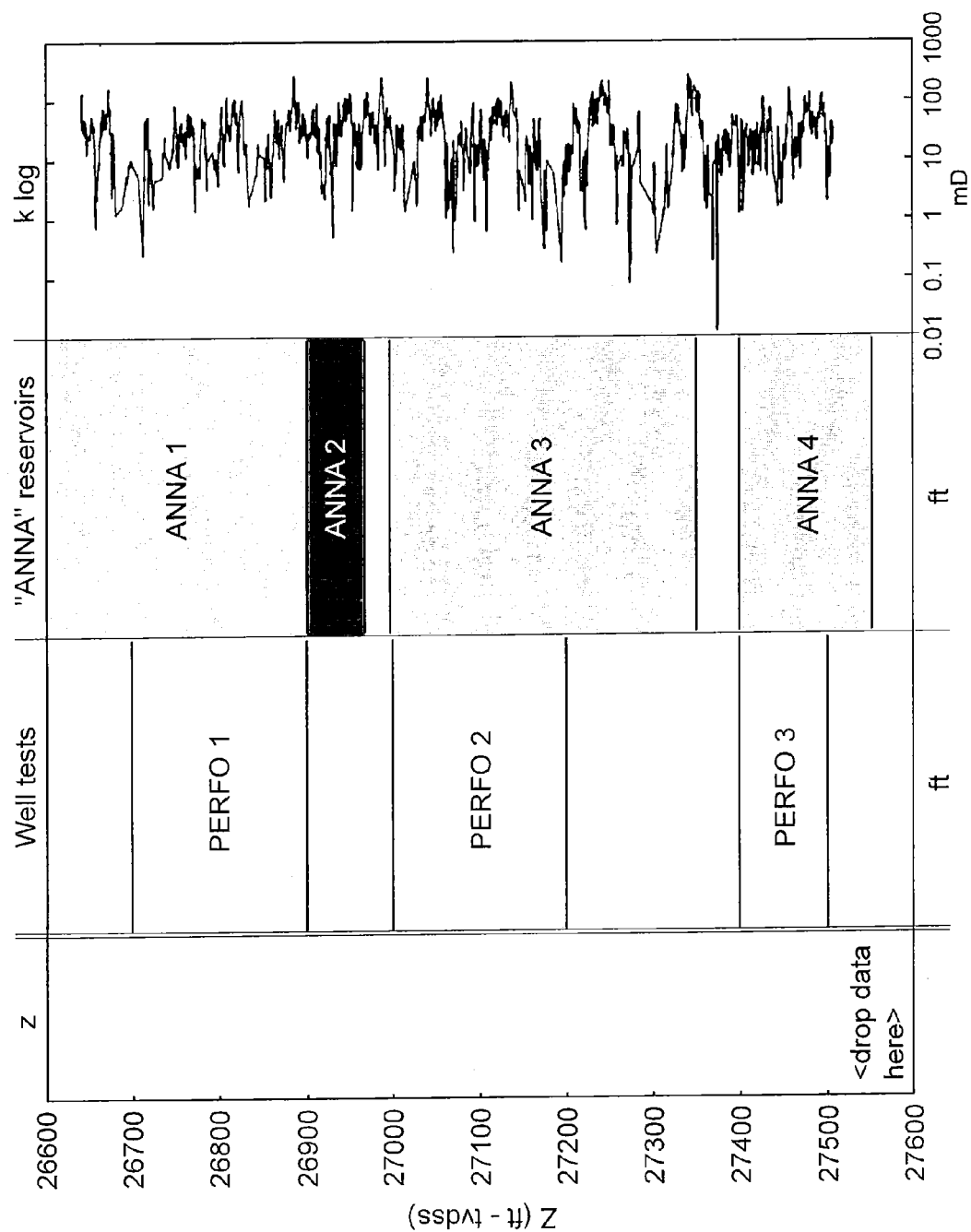
Figure 5:
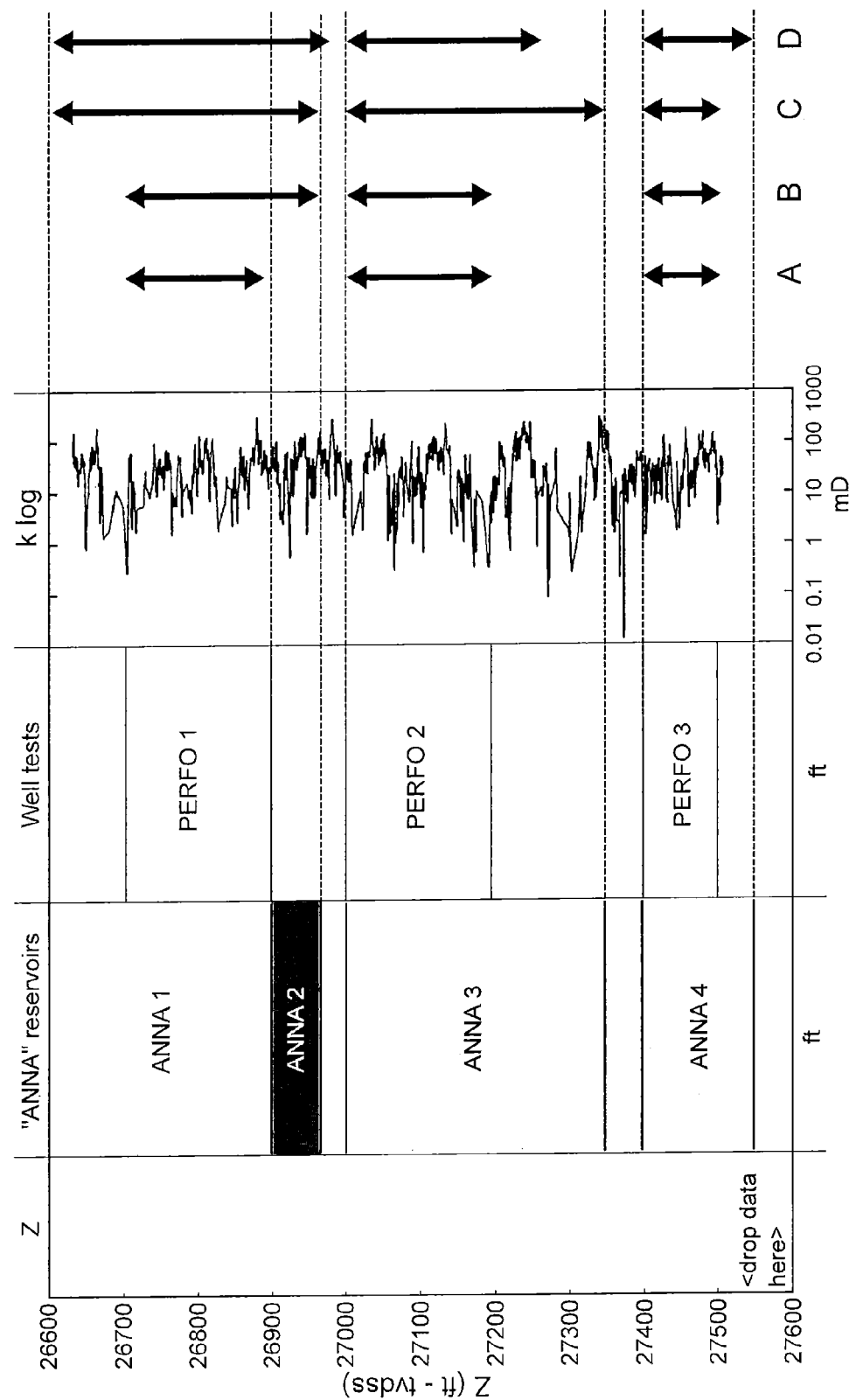
Figure 6:
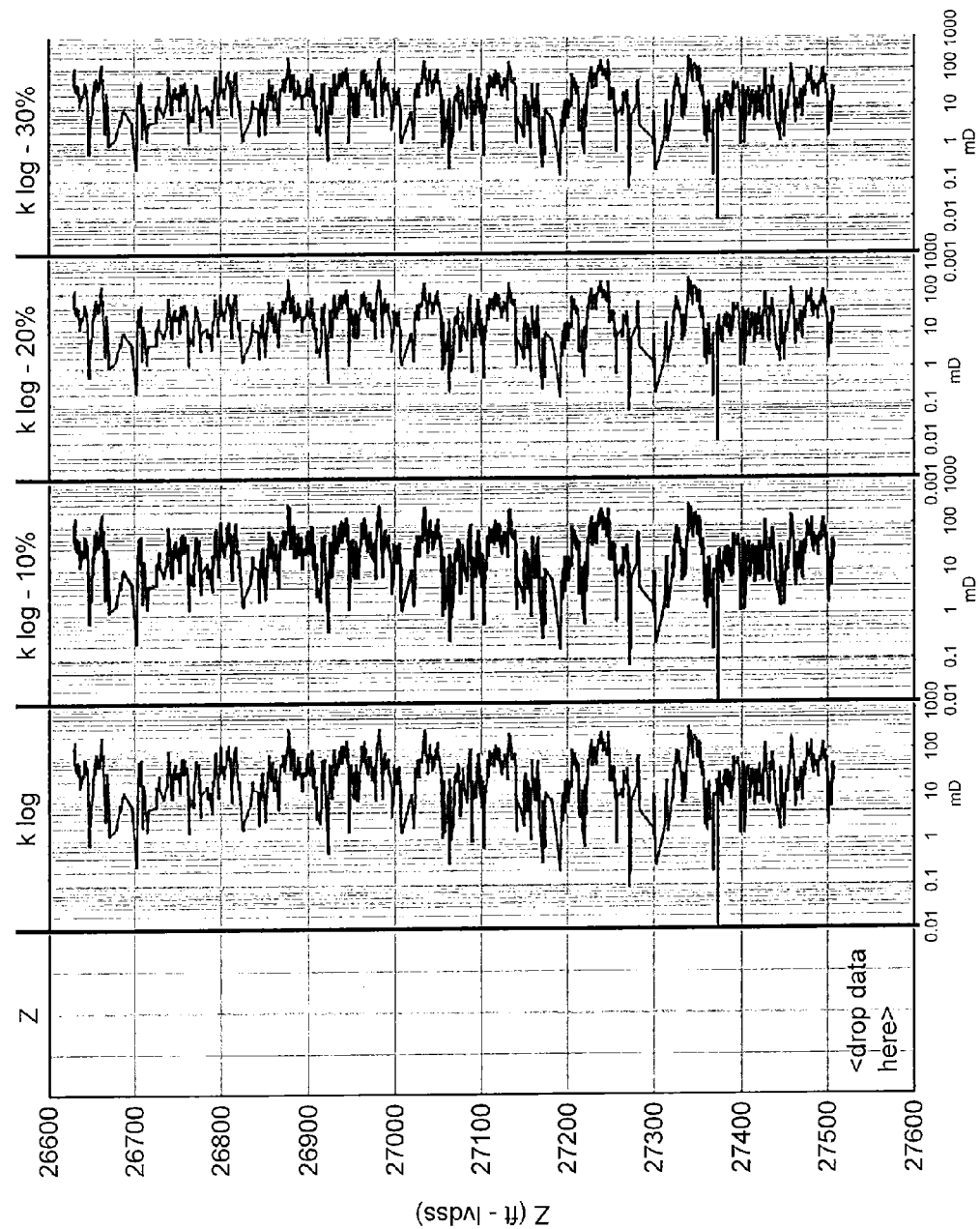

Other characteristics and advantages of the invention will become apparent upon reading the detailed description which follows, of the embodiments of the invention, given exclusively as an example and with reference to the appended drawings which illustrate:

FIG. 1: a flowchart of steps of a method according to an embodiment of the invention;

FIGS. 2A-C: the application of an inversion scheme of a mean power formula relating the apparent permeability $K_H$ to local permeabilities via a power $\omega_H$ and numerical calculation of a value of this power $\omega_{H_i}$;

FIG. 3: a diagnostic step relative to the calculated value of the power $\omega_H$, and FIGS. 4-6: an exemplary application of the method according to the invention.

The invention in its main lines relates to a method for conciliating data intended to populate a hydrocarbon reservoir (computer) model. A set of values of local permeabilities $k_{H_i}$ of the reservoir and a value of an apparent permeability $K_H$ of the reservoir are provided. The provided data are typically in a very large number. One then proceeds with calculating a value of a power $\omega_H$, from a mean power formula, relating the apparent permeability $K_H$ to the local permeabilities via the power $\omega_H$ and previous values. By resorting to an analytical model, the handling of numerous local data is simplified. The relevant formula is somewhat diverted from its initial purpose (i.e. calculating the apparent value) and only requires the calculation of a sum of local data, each of these data being raised to the power of $\omega_H$. The "computing overhead" is therefore modest and allows efficient handling of these data, even in a large number. Typically, a scheme for inverting this formula is established, in order to calculate a value of the power. Next, the calculated value of $\omega_H$ is compared with a reference value and, depending on this comparison, the initially provided data are possibly modified. The steps may possibly be repeated until a satisfactory set of data is obtained, i.e. a set of conciliated data. These conciliated data may then be used for modeling a reservoir and allow estimation of its characteristics. Exploitation of the reservoir is finally facilitated.

In order to describe the invention in more details, reference will now be made to FIG. 1, showing a flowchart of steps of the method according to an embodiment of the invention.

The flowchart reports a step S10 for providing a set of values of local permeabilities $k_{H_i}$ of the reservoir. These data are for example obtained by coring and/or logging, as discussed above. These data are "small scale" data, the order of magnitude of the associated volume is for example of the order of 3 cm³.

A value of the apparent permeability $K_H$ of the reservoir, as obtained by a well test, as stated earlier, is also provided. Preferably, this permeability value is relative to a particular direction, distinct from a direction of a well of the reservoir, for example the direction perpendicular to the direction of the well.

Moreover, in an embodiment, in addition to the small and large scale permeability values, other values may be provided. These other values for example are small scale porosity values as well as an estimation of the mean value of the ratio $k_V/k_H$ (measurements of vertical and horizontal permeabilities), this ratio measuring the petrophysical anisotropy of the reservoir.

Next, one proceeds (step S22) with numerically calculating a value of the power $\omega_H$. The value of the power is calculated from a mean power formula, for example d'Alabert's formula, i.e.:

$$K_H^{\omega_H} = \frac{1}{N} \times \sum_{i=1}^{i=N} k_{H_i}^{\omega_H},$$

which relates the apparent permeability $K_H$ to the local permeabilities via the power $\omega_H$. The calculation further uses the set of values of local permeabilities and of the value of the apparent permeability $K_H$ provided earlier.

Unlike its initial purpose, the relevant formula is not used here for evaluating the apparent permeability $K_H$ but actually for extracting a value of the power $\omega_H$. Various algorithms may be contemplated for extracting the value of the power $\omega_H$. In particular, a scheme for inverting the mean power formula will be explained below.

Next, a step (step S30) is carried out for comparing the calculated power $\omega_H$ at least one reference value. Typically, one tests whether the value of the calculated power $\omega_H$ belongs to an interval. This step has the purpose of establishing a diagnostic of the calculated power $\omega_H$. In particular, the physical and geological consistency of the underlying model is analyzed. This will be detailed below.

Depending on the previous comparison, a modification (step S20) of the initial set of data may be induced. For example, this is the case when the underlying model does not appear to be consistent on a physical and geological level, at the end of the diagnostic step. The relevant modification may notably consist of setting aside data according to a criterion, for example a statistical criterion. This modification may further in the extreme, consist of setting aside a complete subset of data, such as data from a log, or from a reservoir area.

Preferably, the algorithm then again loops on steps S22 and S30, until a satisfactory diagnostic is obtained, at the end of which the modified set of small scale permeability data is validated (step S40).

The result is then a set of conciliated, consistent data with the value of the apparent (large scale) permeability from the point of view of the underlying analytical model (i.e. the d'Alabert formula herein).

These data may then be the subject of other processing operations, for example a step for changing scale of the local permeability values. Various scale-changing techniques are moreover known, in particular algebraic or numerical techniques. In the present case, this change in scale may be based on the value of the calculated power. This change in scale in turn facilitates other calculations, carried out on mesh sizes substantially larger than the effective volumes associated with the local data. The results from these other calculations finally allow an estimation of the characteristics (notably yield) of the reservoir. The exploitation of the reservoir may then be based on such results.

The steps described above are advantageously carried out by means of a computer program (more generally a computer system), which comprises routines for executing said steps.

In parallel with the change in the set of local data (step S20), it should be noted that in the case of a negative diagnostic, it is then sometimes desirable to proceed with checking the well data (apparent permeability, contribution area). The program may in this respect for example include an aid module or at the very least, prompt the user to check the well data and their interpretation (step S24).

Preferably, the provision step (S10, S12) further comprises the provision of a spatial correlation value $L_V$ of the reservoir, along the well direction. This correlation value $L_V$ may for example be provided by the user or calculated from provided local data. The purpose is to be able to simply calculate a spatial correlation value $L_H$ along the direction of the apparent permeability $K_H$, i.e. typically the horizontal direction. The spatial correlation value $L_H$ is advantageously extracted from the power $CO_H$, which may be expressed as a function of spatial correlations $L_V$, $L_H$. The result is thus a complete set of data as regards the statistical description of the reservoir. With this, a diagnostic may be established as to the heterogeneity of the reservoir.

To do this, the power $\omega_H$ may for example be expressed as:

$$\omega_H = \frac{\text{Arctan}\alpha}{\pi - \text{Arctan}\alpha},$$

wherein $$\alpha = \frac{L_H}{L_V} \times \sqrt{\frac{k_V}{k_H}},$$

the ratio $k_V/k_H$ being characteristic of the permeability anisotropy of the reservoir. The parameter $\alpha$ is therefore an anisotropy parameter. The ratio $k_V/k_H$ expresses a mean value of local data; this ratio is generally small (typically $0.01 < k_V/k_H < 1$).

Moreover it should be noted that the same scheme may be implemented as regards vertical permeability and this in order to conciliate data relative to the direction of the well.

Alternatively, the scheme above, when it is implemented for a particular direction (for example the horizontal direction) may advantageously be completed in order to extract data relative to another direction. For example, the method described above may further comprise a step for calculating a value of a power $\omega_V$, distinct from $\omega_H$ and relative to a vertical apparent permeability $K_V$. For this purpose, the power $\omega_V$ is advantageously expressed analytically as a function of $\omega_H$, for example as $\omega_V = a\omega_H + b$, wherein a and b are constants. The constants $a=-2$ and $b=1$ are most particularly appropriate. By decoupling the powers $\omega_V/\omega_H$, it is possible to more easily apprehend the three-dimensional reality of the reservoir and its heterogeneity. Decoupling of the apparent permeabilities $K_V/K_H$ is associated therewith. The calculated value $\omega_V$ may for example be used for calculating a value of the vertical apparent permeability $K_V$. Other types of decoupling may however be contemplated.

A particular embodiment will now be described with reference to FIGS. 2A-C, showing the application of a given inversion scheme for the mean power formula. It is understood that other schemes may however be contemplated by one skilled in the art.

Inversion of this formula which relates the apparent permeability $K_H$ to the local permeabilities via the power $\omega_H$, should allow the value of the power $\omega_H$ to be calculated. For example it comprises two sub-steps. The first of these sub-steps (illustrated by FIGS. 2A-B) consists of building the relationship $$K_H^{\omega_H} = f(\{k_{H_i}^{\omega_H}\}_{i=1,N})$$

from the sole local data. During the second of these sub-steps, a value of the power is inferred from the obtained relationship as well as from the value of the provided apparent permeability (FIG. 2C).

In more details, first of all, one proceeds with elaborating the relationship $$K_H^{\omega_H} = f\left(\{k_{H_i}^{\omega_H}\}_{i=1,N}\right)$$

from d'Alabert's formula, i.e.

$$K_H^{\omega_H} = \frac{1}{N} \times \sum_{i=1}^{i=N} k_{H_i}^{\omega_H}.$$

This is graphically illustrated in FIGS. 2A and 2B. To do this, starting with a given set of possible values of the power $\omega_H$, a corresponding value of the apparent permeability is calculated for each of these values (for example 0.05, as in FIG. 2A), via the above relationship. A relationship is then obtained from the sole local data; so the value of the apparent permeability provided in the provision step is not used here. A "theoretical" relationship is then obtained, as illustrated in FIG. 2B. It is understood that the underlying algorithm does not need to effectively build the curve, the latter only being illustrated for facilitating understanding of the invention. In practice, this relationship may consist in a series of values of $K_H$ associated with a series of values of the power $\omega_H$, which may be noted as:

$$\{\{\omega_{H_1}, K_{H_1}\}, \{\omega_{H_2}, K_{H_2}\}, \ldots, \{\omega_{H_N}, K_{H_N}\}\}$$

If necessary, the series of values of $K_H$ to be calculated may be limited to a given interval, for example in the vicinity of the provided value of $K_H$.

Next, starting with the provided value of $K_H$ a power value associated with the closest value of $K_H$ available in the series is determined. For example when it is determined that conditions $|K_H - K_{H_k}| < |K_H - K_{H_{k-1}}|$ and $|K_H - K_{H_k}| < |K_H - K_{H_{k+1}}|$ are satisfied, then the value $\omega_{H_k}$ is sent back. A value $\omega_{H_k}$ of the power $\omega_H$ (FIG. 2C) has then been calculated.

Alternatively, the series of values of $K_H$ may for example be interpolated by a polynomial of an all the more lower order since the data are dense, and therefore preferably of order one. The relationship may then be locally inverted.

The following step relates to the diagnostic relative to the calculated value of the power $\omega_H$. The latter is now described with reference to FIG. 3, illustrating a particular embodiment.

Two intervals are illustrated by distinct patterns on the curve of FIG. 3. The first illustrates an interval of values acceptable on the physical level [0, 1], the second an interval of values acceptable on the geological level [0.5, 1]. The values of the previous intervals relate to the horizontal component $\omega_H$. As regards the vertical component $\omega_V$, the interval [−1, 1] should be considered on the physical level, and the interval [−1, 0] for the geological level.

The value of $\omega_H$ obtained previously is for example validated by comparing the latter with at least one reference value, for example here, the acceptable upper limit. If the obtained value of $\omega_H$ is greater than 1, the local and/or apparent permeability data need to be revised (according to the proposed scheme with reference to FIG. 1). The obtained value of $\omega_H$ may, if necessary, be compared with other reference values in order to further characterize the obtained value.

In particular, it may be tested whether this value is acceptable on the geological and physical level. In the example of FIG. 3, an obtained power value is comprised between 0.5 and 1. This value is therefore validated both on the physical level and on the geological level. A validation of the value obtained for $\omega_H$ therefore entails validation of the set of local permeability values.

In the following, an exemplary study relative to integrating and making permeability data consistent at different scales, in connection with FIGS. 4-6, is presented.

The relevant hydrocarbon here is oil. The available data are the following (these data are partly illustrated in FIG. 4):

The well was drilled at three different levels of the well. The relevant drillings are denoted as PERFO1, PERFO2 and PERFO3 in the figure and the levels are located relative to the z axis, in ordinates.

First of all, the conducted well test gave rise to a global value of the apparent permeability $K_H$ ($K_H$ hereafter) of 16,000 Md·Ft, with the customary units.

Four reservoir levels are contemplated, which may be affected by the well test: these levels are called ANNA1, ANNA2, ANNA3 and ANNA4 in FIG. 4.

The average oil viscosity is estimated to be 4 cP (not shown).

The permeability was measured on the reservoir by interpreting logs (also called Well logs). The local permeabilities $k_{H_i}$ are shown on the right portion of the figure. The representation as a continuous function of these values is designated by k.

Thus, at this stage, step S10 for providing a set of local permeability values $k_{H_i}$ (or k their representation by a continuous function) and step S12 providing a value of an apparent permeability $K_H$ of the reservoir have been performed.

The questions which may be asked are the following:

Is it possible to make the well test data consistent with the local data (at a small scale)?

If yes, which is(are) the possible contribution area(s)? In particular, does the reservoir ANNA2 contribute to the flow?

If not, which parameters explain the fact that it is impossible to reconcile the data with the different scales?

By means of a module for viewing the data and with what is moreover known of the reservoir, different assumptions are made on the areas contributing to the flow.

These assumptions are denoted as A, B, C and D in FIG. 5. To each of these letters corresponds a characteristic amplitude of the assumption made as to the area contributing to the flow, of each of the levels denoted as ANNA1, ANNA2, ANNA3 and ANNA4.

FIG. 5 illustrates these amplitudes in connection with the levels and drillings already illustrated in FIG. 4.

First of all, the interpretation of the well test leads to a $K_H$ value equal to 16,000 mD·Ft. This interpretation is a customary technique known in the art: the pressure derivative is typically used.

The modeled permeability log and provided for the study is moreover used as a small scale permeability datum for calculating the power coefficient.

In more detail, a value of a power $\omega_H$ is calculated (step S22) from the mean power formula:

$$K_H^{\omega_H} = \frac{1}{N} \times \sum_{i=1}^{i=N} k_{H_i}^{\omega_H}.$$

To do this a relationship $$K_H^{\omega H} = f\left(\{k_{H_i}^{\omega H}\}_{i=1,N}\right)$$

was established beforehand from the mean power formula, as explained above.

Next, the calculated power $\omega_H$ is compared (step S30) with a reference value.

In the present case, the assumptions, confronted with each other, lead to invalid scenarii. In particular, by applying the above step while using the assumptions relative to the test ($K_H$=16,000 Md·Ft) and to the permeability log, it is not possible to obtain a consistent power coefficient.

Now, various solutions may be contemplated. One of them simply consists of modifying the input data by a raw trial-and-error method, and of repeating the steps above until conciliated data are obtained.

Alternatively, modifications may be contemplated, on the basis of knowledge of one skilled in the art. In this respect and in order to accelerate convergence of the process, the potential causes of the conciliation failure should be questioned. The latter may for example be due to the fact that:
  the $K_H$ value given by the test is wrong;
  there may exist an alternative interpretation of the pressure derivative;
  the estimated value of the viscosity is erroneous;
  an assumption on a contribution area may not have been explored;
  the modeled permeability log is not realistic: a new permeability log has therefore to be modeled; or
  the permeability at the scale of the well (permeability log) is not representative of the volume explored by the test. Different phenomena were perhaps poorly identified (karst, fracturation, dissolution, diagenesis). In the latter case, the study cannot be continued.

Consequently, the parameters which are certain and the sensitive parameters should be set. In the present case, it is decided that the most likely contribution area is that of assumption C, wherein all the four reservoirs (except for the basal portion of ANNA4) are requested.

Further, complementary data lead us to believe that the viscosity of the oil is certainly higher than that estimated beforehand.

The average viscosity is estimated as 4.8 cP and the $K_H$ value (from the test) is therefore re-evaluated to 20,000 mD·Ft.

Therefore, at this stage, the modification (the step S20 described hereinbefore) of the values provided in the provision step was carried out.

One therefore proceeds with making the new data consistent, by repeating the steps of the method according to the invention. This time, a consistent result is not obtained by using the assumption on the contribution areas, retained previously (assumption C). Indeed, with this assumption, the value of the power coefficient $\omega_H$ for each of the areas is not satisfactory (equal to about 0.33, which is not acceptable geologically).

At this stage, the potential causes of the conciliation failure should once again be questioned.

Supposing that the assumptions made on contribution areas (assumption C) and on the viscosity of the fluid (4.8 cP) are clearly established, the data on which it is still possible to test sensitivity for obtaining a consistent result are the local permeability log.

In this case, the latter may be substantially reduced in order to allow adjustment of the $K_H$ test.

Consequently, different versions of the permeability log will be generated. This may for example be obtained by means of a module integrated into the operating program of the method according to the invention. These new versions of the log will be used as new small scale permeability data.

Three alternative versions of the permeability log are generated. With them, the impact of a gradual decrease (−10%, and then −20%, and then −30%) of the log on the value of the power coefficient may be tested. These three versions, as well as the original version, are illustrated in FIG. 6, from left to right.

The three new assumptions made on small scale permeability (−10%, −20%, and −30%) are provided (step S10).

At the end of step S22, it appears that a 10% decrease of the permeability log leads to a power coefficient below the acceptability threshold for each of the contribution areas (about 0.5), whereas a 30% decrease leads to an invalid scenario (the power coefficient is larger than 1 in each of the areas). On the other hand, a 20% reduction in the log leads to a power coefficient equal to about 0.85, which is a consistent value from the physical and geological point of view.

As a conclusion, by using the method according to the invention, in the present embodiment, it was possible to:
  cause a first confrontation of the data and evaluate various possibilities;
  identify the potential causes of the impossibility of conciliating the data;
  validate certain assumptions;
  generate alternative versions of a permeability log;
  make the data consistent; and
  determine the power coefficient.

Multiple alternatives of the present invention were described in the foregoing. Other alternatives may be contemplated by one skilled in the art. In particular, although the invention is more generally described with reference to an apparent permeability $K_H$ of the reservoir, and to a power $\omega_H$, the relevant permeability and power are not necessarily relative to a horizontal direction perpendicular to the well direction. The invention may for example notably apply to vertical components or to average components.

The invention claimed is:

1. A method for conciliating hydrocarbon reservoir model data, the method comprising:
  providing a set of local permeabilities values $k_{H_i}$ of a reservoir and an apparent permeability value $K_H$ of the reservoir using a computer;
  calculating, using the computer, a power value $\omega_H$ from a mean power formula, $$K_H^{\omega H} = \frac{1}{N} \times \sum_{i=1}^{i=N} k_{H_i}^{\omega H},$$

relating the apparent permeability value $K_H$ to the set of local permeabilities values $k_{H_i}$ via the power value $\omega_H$, wherein N is an integer, and from the set of local permeabilities values $k_{H_i}$ and the apparent permeability value $K_H$;
  comparing the power value $\omega_H$ with a reference value using the computer;

modifying the set of local permeabilities values $k_{H_i}$ and the apparent permeability values $K_H$ using the computer to obtain the conciliated hydrocarbon reservoir model data;

changing a scale of the set of the local permeability values $k_{H_i}$ based on the power value $\omega_H$; and estimating a characteristic of the reservoir using a result from the scale changed based on the power value $\omega_H$.

2. The method according to claim 1, wherein the power value $\omega_H$ is calculated based on a relationship, $$K_H^{\omega_H} = f(\{k_{H_i}^{\omega_H}\}_{i=1,N}).$$

3. The method according to claim 1, wherein the apparent permeability value $K_H$ is relative to a direction distinct from a direction of a well of the reservoir.

4. The method according to claim 3 further comprising:
providing a spatial correlation value $L_V$ of the reservoir along the direction of the well; and
calculating a spatial correlation value $L_H$ along the direction of the apparent permeability value $K_H$, from the power value $\omega_H$, expressed as a function of the spatial correlation values $L_V$, $L_H$.

5. The method according to claim 4, wherein the power value $\omega_H$ is further a function of a petrophysical anisotropy $k_V/k_H$ of the reservoir.

6. The method according to claim 5, wherein the power value $\omega_H$ is expressed as:

$$\omega_h = \frac{\text{Arctan}\alpha}{\pi - \text{Arctan}\alpha}, \text{ wherein } \alpha = \frac{L_H}{L_V} \times \sqrt{\frac{k_V}{k_H}},$$

the ratio $k_V/k_H$ being a characteristic of the petrophysical anisotropy.

7. The method according to claim 3, wherein the direction distinct from the direction of the well is perpendicular to the direction of the well.

8. The method according to claim 1 further comprising:
calculating a power value $\omega_V$ relative to a vertical apparent permeability value $K_V$, the power value $\omega_V$ being expressed as $\omega_V = a\omega_H + b$, wherein a and b are constants.

9. A method for conciliating hydrocarbon reservoir model data, the method comprising:
providing a set of local permeabilities values of a reservoir and an apparent permeability value of the reservoir using a computer;
calculating a power value from a mean power formula and the set of local permeabilities values and the apparent permeability value using the computer, the mean power formula relating the apparent permeability value to the set of local permeabilities values via the power value;
comparing the power value with a reference value using the computer;
modifying the set of local permeabilities values and the apparent permeability values using the computer to obtain the conciliated hydrocarbon reservoir model data;
changing a scale of the set of the local permeability values, based on the power value; and
estimating a characteristic of the reservoir using a result from the scale changed based on the power value.

10. A non-transitory computer readable storage medium encoding a computer executable program for executing a process, the process comprising:
providing a set of local permeabilities values of a reservoir and an apparent permeability value of the reservoir;
calculating a power value from a mean power formula and the set of local permeabilities values and the apparent permeability value, the mean power formula relating the apparent permeability value to the set of local permeabilities values via the power value;
comparing the power value with a reference value;
modifying the set of local permeabilities values and the apparent permeability values to obtain the conciliated hydrocarbon reservoir model data;
changing a scale of the set of the local permeability values, based on the power value; and
estimating a characteristic of the reservoir using a result from the scale changed based on the power value.

* * * * *